Patented Dec. 25, 1951

2,580,039

UNITED STATES PATENT OFFICE 2,580,039

METHOD OF PRODUCTION OF AN IRON CATALYST FOR HYDROCARBON SYNTHESIS

Robert C. Morbeck, Cranford, N. J., assignor to Standard Oil Development Company, a corporation of Delaware No Drawing. Application September 16, 1948, Serial No. 49,641

4 Claims. (Cl. 260—449.6)

The present invention relates to the catalytic conversion of carbon oxides with hydrogen to form valuable hydrocarbons and oxygenated organic products. The invention relates more particularly to improved catalysts for this synthesis employing the fluid solids technique, and particularly to a sintered iron catalyst which is particularly effective, resistant to fouling by carbon formation and resistant to disintegration.

It is known that mixtures of carbon monoxide and hydrogen when brought into intimate contact with catalysts under suitable conditions of temperature and pressure are converted into hydrocarbons and oxygenated organic compounds, producing valuable unsaturated liquid hydrocarbons in the gasoline range having high octane ratings. The catalytic conversion of carbon monoxide and hydrogen can be carried out in fixed bed, slurry, or fluid solids type of operation. The advantages of the latter, such as improved heat distribution, transfer, and control, and of intimate mixing and contact of the catalyst with the reactants are well-known. Two problems that arise particularly in conjunction with the fluid solids type of operation are the fouling and consequent inactivation of the catalyst by carbon deposition and the tendency of the catalyst particles to disintegrate, presumably because of carbon formation and deposition within the lattice of the catalyst particles.

As a result of carbon formation and catalyst disintegration, fluidization of catalyst becomes increasingly more difficult and consequently the process requires relatively frequent interruptions to remove carbon and fragmented catalyst.

Experience and prior art have shown that active hydrocarbons synthesis catalysts which give high yields of valuable liquid hydrocarbons also form considerable carbon. On the other hand it is also known that catalysts which form little carbon during the hydrocarbon synthesis process do not show high activity either in terms of yields of valuable liquid hydrocarbons or in terms of high conversion levels of carbon monoxide and hydrogen. Furthermore, it is known that increase in yields of $C_4+$ products and higher conversions of synthesis gas may be attained for a given catalyst by increasing the temperature level in the hydrocarbon synthesis reaction zone within rather definite limits. It is also generally found that increasing the conversion temperature is accompanied in turn by increase in carbonization and carbon deposition within the reactor. Thus when a typical hydrocarbon synthesis catalyst is employed, such as fused ammonia synthesis catalyst, it is found that when the conversion temperature is raised from the normal hydrocarbon synthesis conversion temperature of 650° F. to 700° F., the synthesis gas conversion increases from 96% to 98%, at 30 v./hr./w., $2.0/1 H_2/CO$, 2/1 recycle; the yield of the desired $C_4+$ product increases from 160 cc. to 173 cc./m.$^3$ converted $H_2+CO$. The carbon formation rate, however, has increased from 7 to 16 grams of carbon formed per 100 grams of catalyst per 100 hours. Part of this increased carbon is due to a lower $H_2$ partial pressure at 700° F. (228 vs. 275 p. s. i.). At the same $H_2$ partial pressure one would expect about 11 grams carbon per 100 grams catalyst per 100 hours. Thus in general, it has been found that low carbon formation rates are accompanied by relatively low yields of desired synthesis products and those steps which increase conversion rates and increase yields of high octane gasoline also increase the amount of carbon deposition and catalyst fouling.

It is a purpose of this invention to disclose a process whereby high yields of desired high octane motor fuels and other valuable hydrocarbons and high conversion of synthesis gas may be obtained without significant formation of carbon or catalyst fouling in the hydrocarbon synthesis reaction.

Another purpose of the invention is to disclose the use of a particularly desirable catalyst in the synthesis of hydrocarbons from carbon monoxide and hydrogen, wherein high product yields are obtained and only insignicant quantities of carbon are produced.

It has now been found that a potassium carbonate-promoted red iron oxide hydrocarbon synthesis catalyst having exceptionally low carbon formation tendencies in the synthesis of hydrocarbons and oxygenated organic compounds from CO and $H_2$ can be prepared by severely sintering the catalyst at elevated temperature, in the neighborhood of from 1550° F. to 1650° F. When such a catalyst was employed under the conventional hydrocarbon synthesis conditions, namely, 650° F. temperature, and about 400 p. s. i. g., an exceptionally low carbon formation rate was found. However, as expected, a low equilibrium synthesis gas conversion level of about 83 volume percent of $H_2+CO$ was obtained. The surprising discovery was made, however, that when the reaction temperature was raised about 50 to 100° F., i. e., to about 675–750° F., the expected increase in synthesis gas conversion to a high level and the increase to a high level of the yield of useful products was not accompanied by a corresponding increase in the rate of carbon formation and catalyst fouling; the carbon formation at these elevated temperatures was considerably less than that produced by a synthesis catalyst not so treated at the above sintering temperatures and also less than that produced by other catalysts at equivalent synthesis gas conversion levels and C4+ selectivities. This discovery was completely unexpected in view of the heretofore mentioned correlation of substantial increase of carbon deposition with increase of yields for any particular hydrocarbon synthesis catalyst. Thus, by the process of this invention, by employing a severely sintered potassium carbonate promoted red iron oxide catalyst in the hydrocarbon synthesis reaction, high yields of useful products are obtained with a minimum of catalyst fouling under conditions which normally, with catalyst not so treated, would produce substantial quantities of carbon and thus limit the extent of usefulness of the fluid solids technique in hydrocarbon synthesis.

Prior to the present invention, it has been known that one of the most satisfactory means of overcoming the tendency of an iron synthesis catalyst to disintegrate has been to sinter the latter in the presence of a non-oxidizing or even reducing atmosphere. This sintering operation was first suggested by Michael (U. S. 2,183,146 and U. S. 2,254,748) at a time before the fluid solids technique had been applied to the hydrocarbon synthesis process.

With the introduction of the fluid technique to the hydrocarbon synthesis reaction, several problems in the application of sintered catalysts to this improved process are apparent. First and foremost is the problem of grinding the sintered catalyst to fluidizable size. In the fixed bed process of Michael, it was sufficient to pill the catalyst before sintering to suitable pea size and then sinter, the agglomerating effect of the sintering being to give an extremely hard body which may be used as such in the fixed bed process with or without prior promoter addition. In the fluid solids process, however, the catalyst particles must be of an average size so that the resultant catalyst mass is fluidizable under the reaction conditions obtained in the hydrocarbon synthesis reactor. Under normal reaction conditions, an average fluidizable particle distribution of the catalyst would be the following:

| Mesh: | Percent |
| --- | --- |
| Up to 100 | 0 |
| 100 - 200 | 40 |
| 200 - 270 | 20 |
| 270 - 325 | 20 |
| Through 325 | 20 |

In order to obtain sintered iron catalyst particles of a size suitable for fluidization, that is, in the range of 100 to 325 mesh, it has been found that grinding operations can be greatly simplified and substantially eliminated when the catalyst is sintered in the form of small granules rather than in the form of pills, as practiced heretofor. The size of the granules is selected so that the shrinkage accompanying the "incipient fusion" of the promoted red iron oxide on sintering gives a product which after granulating or light grinding to break apart the individual particles has approximately the desired size for good fluidization. Depending upon the particle size desired for the fluid operation the dried material prior to sintering may be broken up into granules from 60–80 mesh, 60–100 mesh or, to obtain a wider range of particle size, all material passing through a 40 or 60 mesh screen may be used for the sintering operation. Thus whereas by the previous method of sintering pills only about a 5–10% yield of catalyst passing through an 80 mesh screen was obtained by putting the pills through a planetary disc grinder 25 times, by the process of the present invention whereby granules passing through a 40 mesh screen are employed in the sintering operation, a product comprising a 50% yield of catalyst passing through an 80 mesh screen was obtained when the sintered catalyst was put through the grinder only five times. Thus a tenfold increase in fluidized catalyst yield was accompanied by a five-fold decrease in grinding requirements.

Red iron oxide catalyst is generally prepared for use in the hydrocarbon synthesis reaction by steps comprising precipitating the hydroxide from solution, washing, filtration, drying, impregnation of the iron compound with the desired promoter, such as $K_2CO_3$ or $KF$ to give a product which, on drying at approximately 200–400° F. may contain about 1–3% of the promoter. In accordance with the present invention, the dried impregnated red iron oxide is first pilled and then broken up into particles of such size that all pass through a number 40 mesh screen. The dried and screened product may then be charged to a suitable reducing apparatus, air removed by flushing with an inert gas, and then a reducing gas such as hydrogen is passed through the promoted red iron oxide bed at a relatively high flow rate of 750–1500 v./v./hr., the reduction being carried out at temperatures between 900°–1100° F., preferably at the higher range, and the flow of gas continued until no further reduction takes place.

The latter portion of the sintering step, as described more fully below, is advantageously carried out under very low hydrogen throughput rates. It has now been found that the customary method of hydrogen sintering in which the temperature is raised from the hydrogenation to the sintering range, but the rate of hydrogen throughput remains substantially the same for the whole of the sintering treatment, a large proportion of the promoter on the catalyst is volatilized and causes plugging of vent lines in the cooling section of the furnace, and the composition and proportion of promoter on the catalyst is difficult to control. It has been found that this difficulty is largely eliminated by reducing the flow during the latter portion of the sintering period to a very low rate of about 100–200 v./v./hr., the purpose of the slow sweep being merely to insure that no air gets into the furnace. However, in order to obtain an iron catalyst containing less than about 1% oxygen content it is important, during the initial stages of the sintering processes, to maintain hydrogen throughputs of substantially the same order of magnitude as during the reduction step proper for it has been found that reduction of this type of catalyst is not complete even after treatment with hydrogen at 1100° F. for from 3 to 6 hours.

Following the hydrogenation step, therefore, the temperature in the furnace may be raised to the desired sintering range of about 1550° F. to 1650° F. The promoted reduced catalyst may be maintained at the sintering temperature from about 1 hour at the high flow velocity of 750–

1500 v./v./hr., then for about 2-4 hours at a low hydrogen flow of about 100-200 v./v./hr. The material may then be cooled in hydrogen or an inert gas to room temperature. Only a light grinding operation is required after cooling. The time during which the catalyst may be exposed to reduction temperatures is a function of the hydrogen flow rate. Thus at a temperature of 1100° F. and a flow rate of 1500 v./v./hr., the residence time of the catalyst in the reducing period may be 4 hours. On the other hand, if the flow rate is reduced to about 1000 v./v./hr., the reduction period is increased to about 6 hours. In general, high space velocities can be compensated by decreased reduction time and if the operation is carried out at the lower space velocities the contact time is increased.

The invention may be further illustrated by the following specific example.

EXAMPLE

Preparation of catalyst

A sixty pound batch of the dried impregnated material prepared as described above was fragmented into granules of a size small enough to pass through a #10 mesh sieve, and the product was classified by a #20 mesh sieve. The material retained by the #20 mesh sieve and that which passed through said sieve were then separately made into pills about ⅜" in diameter in a pilling machine. It was advantageous to add a pilling compound, such as "Sterotex" wax, to the classified portions before pilling. The pills thus formed were then fragmented through a series of sieves until all the material passed through a #40 mesh sieve. This method of preparation of red iron oxide promoted catalyst for sintering substantially avoids the plugging encountered in the smaller sieves when the dried impregnated material is broken successively through a series of sieves until all the material passes through a #40 mesh sieve, thus saving substantially on time and labor.

The dried and classified granulated product was then charged to a closed tube fitted with inlet and outlet connections for gases. The material was flushed with nitrogen to remove air and then hydrogen was introduced. The entire tube was heated by means of a furnace to about 1100° F. and then held at that temperature for about 4 hours while hydrogen was passed through the bed of catalyst at the rate of about 1500 v./v./hr. The temperature was then raised to about 1570° F. while under hydrogen, and the system was maintained at that temperature for 1 hour with the same hydrogen flow, then the flow was decreased to a low hydrogen flow rate of 200 v./v./hr. and maintained under these conditions for 3 hours.

The catalyst was then cooled under nitrogen to room temperature and discharged into air and given a light grinding. The sintered mass was given a final classification by shaking through an 80 mesh screen. The product thus obtained was of a size desirable for good fluidization, with particle distribution as follows:

| | Per cent |
|---|---|
| Through 100 mesh | 71.0 |
| Through 80 on 100 | 9.0 |
| On 80 | 14.4 |
| Fines | 5.6 |

The bulk density of the final production was 2.2 to 2.3 as against the density of the unsintered material which was 1.1 to 1.2. This increase in bulk density is a measure of the decrease in the particle size and increase in particle density resulting from the sintering operation. This decrease in particle size is important in the fluid catalytic technique.

To indicate the superior anti-fouling and carbon formation resisting properties of a reduced alkali metal-promoted iron oxide catalyst classified and sintered in accordance with the present invention, the following data are given from fluid catalyst hydrocarbon synthesis pilot plant runs.

I. AMMONIA SYNTHESIS CATALYST [1]

| Operating Conditions | A | B |
|---|---|---|
| Temperature | 650 | 700 |
| Pressure, p. s. i. g | 650 | 650 |
| $H_2$/CO Feed Ratio | 2 | 2 |
| Recycle Ratio | 2 | 2 |
| Feed Gas Rate (Std. Cu. Ft. $H_2$+CO/Hr./lb. catalyst) | 30 | 30 |
| Catalyst Age—Hrs | 149 | 270 |
| Hydrogen Partial Pressure, p. s. i | 275 | 228 |
| Per Cent Conversion, $H_2$+CO | 96 | 98 |
| Yield of $C_4$+oil, cc./m.³ converted $H_2$+CO | 160 | 173 |
| Disintegration Rate [2] | 7 | 23 |
| Carbon Formation Rate [3] | 7 | 16 |

II. SINTERED PROMOTED RED IRON OXIDE CATALYST

| | C | D | E |
|---|---|---|---|
| Catalyst Sintering Temperature, °F | 1520 | 1570 | 1570 |
| Synthesis Reaction Temperature, °F | 650 | 650 | 700 |
| Pressure, p. s. i. g | 650 | 400 | 400 |
| $H_2$/CO Feed Ratio | 1.2/1 | 1.2/1 | 1.2/1 |
| Recycle Ratio | 2/1 | 2/1 | 2/1 |
| Feed Gas Rate, SCF/Hr./lb. catalyst | 18–30 | 10 | 10 |
| Catalyst Age | 0–507 | 0–235 | 235–451 |
| Hydrogen Partial Pressure, p. s. i | 170–250 | 155 | 126 |
| Per Cent Conversion, $H_2$+CO | 95 | 83 | 94 |
| Yield of $C_4$+oil, cc./m.³ converted $H_2$+CO | 165 | 172 | 186 |
| Disintegration Rate [2] | 30–40 | 8 | 8 |
| Carbon Yield—grams/m.³ $H_2$+CO converted [3] | 1.7 | 0.5 | 0.9 |

[1] Alumina and Potassia promoted fused, reduced magnetite.
[2] Grams of 0–20 micron material formed per 100 grams of 20+ microns present per 100 hours.
[3] Grams of carbon formed per 100 grams C and $O_2$ free catalyst per 100 hours.

From the above experimental data it can readily be seen that whereas in the case of fused and regularly sintered iron catalyst, increase in conversion temperature is accompanied by substantial increase in the amount of carbon formed, in the case of the severely sintered catalyst, raising the temperature to a level where yields of $C_4$+ oil are of the same order of magnitude as in the case of the other two catalysts is not accompanied by significant carbon formation; in the above case, the carbon formation of the severely sintered catalyst at the same hydrogen partial pressure and catalyst age was only 42% of that obtained with a catalyst of satisfactory initial activity but sintered 50° F. lower.

The foregoing description and examples, though illustrating specific applications and results of the invention, are not intended to exclude other modifications obvious to those skilled in the art, and which are within the scope of the invention.

What is claimed is:

1. An improved process for converting carbon monoxide and hydrogen into valuable normally liquid hydrocarbons and oxygenated organic compounds which comprises contacting carbon monoxide and hydrogen in synthesis proportions and at temperatures in the range of from about 675° to 750° F. with a dense turbulent mass of finely divided reduced fresh red iron oxide particles of fluidizable size sintered in an atmosphere of hydrogen at a temperature of from about 1550° to 1650° F., said sintering being subsequent to reduction and said catalyst being promoted with a minor amount of an alkali metal carbonate promoter.

2. The process of claim 1 wherein synthesis conditions include pressures of about 400 pounds.

3. The process of claim 1 wherein said catalyst is reduced prior to sintering by treatment with hydrogen at about 900° to 1100° F.

4. The process of claim 1 wherein the catalyst is promoted prior to sintering.

ROBERT C. MORBECK.

REFERENCES CITED

The following references are of record in the file of this patent:

UNITED STATES PATENTS

| Number | Name | Date |
| --- | --- | --- |
| 2,417,164 | Huber, Jr. | Mar. 11, 1947 |
| 2,455,419 | Johnson | Dec. 7, 1948 |
| 2,462,861 | Gunness | Mar. 1, 1949 |
| 2,471,129 | Vesterdal | May 24, 1949 |
| 2,471,130 | Vesterdal | May 24, 1949 |
| 2,496,343 | Gillespie | Feb. 7, 1950 |
| 2,510,823 | Krebs | June 6, 1950 |